(12) United States Patent
Katoh et al.

(10) Patent No.: US 7,541,788 B2
(45) Date of Patent: Jun. 2, 2009

(54) SWITCHING REGULATOR AND METHOD FOR SWITCHING OUTPUT VOLTAGE THEREOF

(75) Inventors: Tomonari Katoh, Osaka (JP); Masahiro Matsuo, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 151 days.

(21) Appl. No.: 10/587,255

(22) PCT Filed: Nov. 24, 2005

(86) PCT No.: PCT/JP2005/022037

§ 371 (c)(1),
(2), (4) Date: Feb. 27, 2007

(87) PCT Pub. No.: WO2006/057431

PCT Pub. Date: Jun. 1, 2006

(65) Prior Publication Data

US 2007/0159151 A1 Jul. 12, 2007

(30) Foreign Application Priority Data

Nov. 26, 2004 (JP) ............................. 2004-342430

(51) Int. Cl.
*G05F 1/40* (2006.01)
*G05F 1/56* (2006.01)

(52) U.S. Cl. ..................................... 323/282; 323/271

(58) Field of Classification Search ......... 323/222–225, 323/265, 268, 271, 282, 284, 285
See application file for complete search history.

(56) References Cited

U.S. PATENT DOCUMENTS

| 6,456,050 B1 * | 9/2002 | Agiman ....................... 323/282 |
| 6,642,697 B2 * | 11/2003 | Zuniga et al. ............... 323/223 |
| 7,061,213 B2 * | 6/2006 | Yoshida ....................... 323/224 |
| 7,138,786 B2 * | 11/2006 | Ishigaki et al. ............... 323/224 |
| 2007/0176588 A1 * | 8/2007 | Nishida ....................... 323/284 |

FOREIGN PATENT DOCUMENTS

| JP | 11-150951 | 6/1999 |
| JP | 2000-330671 | 11/2000 |
| JP | 2002-300774 | 10/2002 |
| JP | 2004-88964 | 3/2004 |
| TW | 554605 | 9/2003 |

* cited by examiner

*Primary Examiner*—Matthew V Nguyen
(74) *Attorney, Agent, or Firm*—Dickstein Shapiro LLP

(57) ABSTRACT

A switching regulator converts an input voltage to a predetermined voltage and outputs the predetermined voltage to a load through an output terminal. The switching regulator includes a first switching element, a second switching element, a control switching circuit part, and a smoothing circuit. When a first operating mode in which a PFM control is performed and a voltage from the output terminal becomes a first voltage is shifted to a second operating mode in which a PWM control is performed and the voltage from the output terminal becomes a second voltage larger than the first voltage, the control switching circuit part increases the voltage from the output terminal stepwise progressively from the first voltage to the second voltage while performing the PWM control.

13 Claims, 5 Drawing Sheets

SWITCHING REGULATOR AND METHOD FOR SWITCHING OUTPUT VOLTAGE THEREOF

TECHNICAL FIELD

The present invention generally relates to a switching regulator that can change the output voltage used in portable devices, and especially to a switching regulator for lowering an overshoot of the output voltage when increasing the output voltage, and a method for switching the output voltage of the switching regulator.

BACKGROUND ART

In recent years, the saving energy has become desirable from the point of view of environmental operations. In devices such as a cell phone, a digital camera and the like wherein a battery is used, reducing the electric power consumed in the devices has become more important from the view of increasing the service life of the battery. For this purpose, as for the power supply circuit, non-insulated step-down type switching regulators with high efficiency and reduced size in which an inductor is used are in wide use (hereinafter, referred to as switching regulators). The switching regulators are highly efficient at rated loads. However, since the consumption of electric current by the switching regulators themselves is comparatively large, the efficiency of the devices becomes extremely low when the devices are in a light-load drive mode such as a stand-by mode, a sleep mode and the like.

In order to improve the efficiency even if the devices are in the light-load drive mode, Japanese Laid-Open Patent Application No. 2002-300774 provides a method for reducing the electric power consumed in the switching regulator by switching PWM control to PFM control in the light-load drive mode so as to lower the switching frequency.

FIG. 5 is a schematic circuit diagram illustrating an example of the switching regulator.

In FIG. 5, a switching regulator 100 includes a PWM control circuit 101 and a PFM control circuit 102. The switching regulator 100 further includes a switching element 103 driven in the PWM control circuit 101 and another switching element 104 driven in the PFM control circuit 102.

In the normal operating mode, the PFM control circuit 102 stops operations. The PWM control circuit 101 operates so as to control switching on and off the switching element 103. In the light-load drive mode, the PWM control circuit 101 stops operating. The PFM control circuit 102 operates so as to control switching on and off the switching element 104.

Since a large amount of the electricity flows in the switching element 103 which is used when performing the PWM control, the size of the element 103 is increased so as to lower the on-resistance. However, this causes an increase of the gate capacitance since the element 103 size becomes large.

The loss of the switching regulator in a case where the electric current is supplied to the load (hereinafter, referred to as the load electric current) consists mostly of loss owing to the on-resistance of the switching element 103. When the load electric current is small, the loss of the switching regulator consists mostly of a loss owing to the charging and discharging of the gate capacitance of the switching element 103.

Accordingly, the switching element 104 is reduced in size to keep the gate capacitance small even though the on-resistance of the switching element 104 is large. The efficiency of the switching regulator is improved thereby.

Japanese Laid-Open Patent Publication No. 2002-300774 discloses such a switching regulator.

However, there is a problem of generating overshoot in the output voltage as shown in FIG. 6, when the output voltage of the switching regulator is enabled to change from the low voltage to the high voltage. In addition, there is another problem that the overshoot becomes larger when the switching element with a high on-resistance is changed to a switching element with a low on-resistance at the same time as changing the output voltage.

Moreover, in the light-load drive mode in which the load electric current is small, the load circuits such as a CPU using the switching regulator 100 as a power supply for operation often stops the operation, that is, the load circuits are in the sleep mode or in the stand-by mode. In such a light-load drive mode, the operating voltage of the load circuits can often be smaller than the operation voltage in the normal drive mode. Accordingly, it is normal that the output voltage of the switching regulator is lowered so as to lower the load electric current.

However, in a case of shifting the drive mode from the light-load drive mode to the normal drive mode, when switching the control mode of the switching regulator from the PFM control to the PWM control and simultaneously changing the output voltage from the low voltage to the high voltage, the overshoot voltage is generated in the output voltage as described above. Accordingly, there is a risk of causing failure in the CPU and the other circuits.

DISCLOSURE OF THE INVENTION

The present invention provides a switching regulator and a method for switching the output voltage thereof that can realize lowering the overshoot generated when raising the output voltage in shifting from the light-load drive mode to the normal drive mode and that substantially obviates one or more problems caused by the limitations and disadvantages of the related art.

A preferred embodiment of the present invention provides a switching regulator converting an input voltage to a predetermined voltage and outputting the predetermined voltage to a load through an output terminal. The switching regulator includes a first switching element including a first control electrode performing switching according to a control signal input to the first control electrode and controlling outputting the input voltage, a second switching element including a second control electrode having capacitance larger than the capacitance of the first control electrode of the first switching element and an on-resistance smaller than the on-resistance of the first switching element. The second switching element performs switching according to a control signal input to the second control electrode and controls outputting the input voltage. The switching regulator further includes a control switching circuit part performing one of a PWM control on both of the first switching element and the second switching element and a PFM control only on the second switching element according to an operating mode so that a voltage output from the output terminal is the predetermined voltage, and a smoothing circuit smoothing a voltage output from each of the first switching element and the second switching element and outputting the smoothed voltage to the output terminal. When a first operating mode in which the PFM control is performed and the voltage from the output terminal becomes a first voltage is shifted to a second operating mode in which the PWM control is performed and the voltage from the output terminal becomes a second voltage larger than the first voltage, the control switching circuit part increases the voltage from the output terminal stepwise progressively from the first voltage to the second voltage while performing the PWM control.

According to at least one of the embodiments of the present invention, a method for switching an output voltage of a switching regulator is provided. The switching regulator includes an input terminal, an output terminal, a load, a first switching element including a first control electrode performing switching according to a control signal input to the first control electrode and controlling outputting an input voltage and a second switching element including a second control electrode having capacitance larger than the capacitance of the first control electrode of the first switching element and an on-resistance smaller than the on-resistance of the first switching element. The second switching element performs switching according to a control signal input to the second control electrode and controls outputting the input voltage. The switching regulator is enabled to change the output voltage so as to convert the input signal input from the input terminal into a predetermined voltage and to output the predetermined voltage to the load via the output terminal by performing one of a PWM control on both of the first switching element and the second switching element and a PFM control only on the second switching element according to an operating mode, the method comprising a step of increasing the voltage from the output terminal stepwise progressively from the first voltage to the second voltage while performing the PWM control when a first operating mode in which a PFM control is performed and the voltage from the output terminal becomes a first voltage is shifted to a second operating mode in which PWM control is performed and the voltage from the output terminal becomes a second voltage larger than the first voltage.

According to the above described switching regulator, when the first operating mode in which the PFM control is performed and the output voltage from the output terminal becomes the predetermined first voltage is shifted to the second operating mode in which the PWM control is performed and the output voltage from the output terminal becomes the second voltage larger than the first voltage, the PWM control is performed and the output voltage from the output terminal is gradually increased from the first voltage to the second voltage. Accordingly, overshoot voltage which is generated when increasing the output voltage is reduced so that the output voltage can be switched without being influenced by the overshoot. Moreover, the switching elements which are fitted to each of the PWM control and the PFM control are adopted so as to increase the efficiency both in the PWM control and the PFM control.

BEST MODE FOR CARRYING OUT THE INVENTION

Next, a detailed description is given of preferred embodiments shown in the accompanying drawings of the present invention.

First Embodiment

Figure 1:
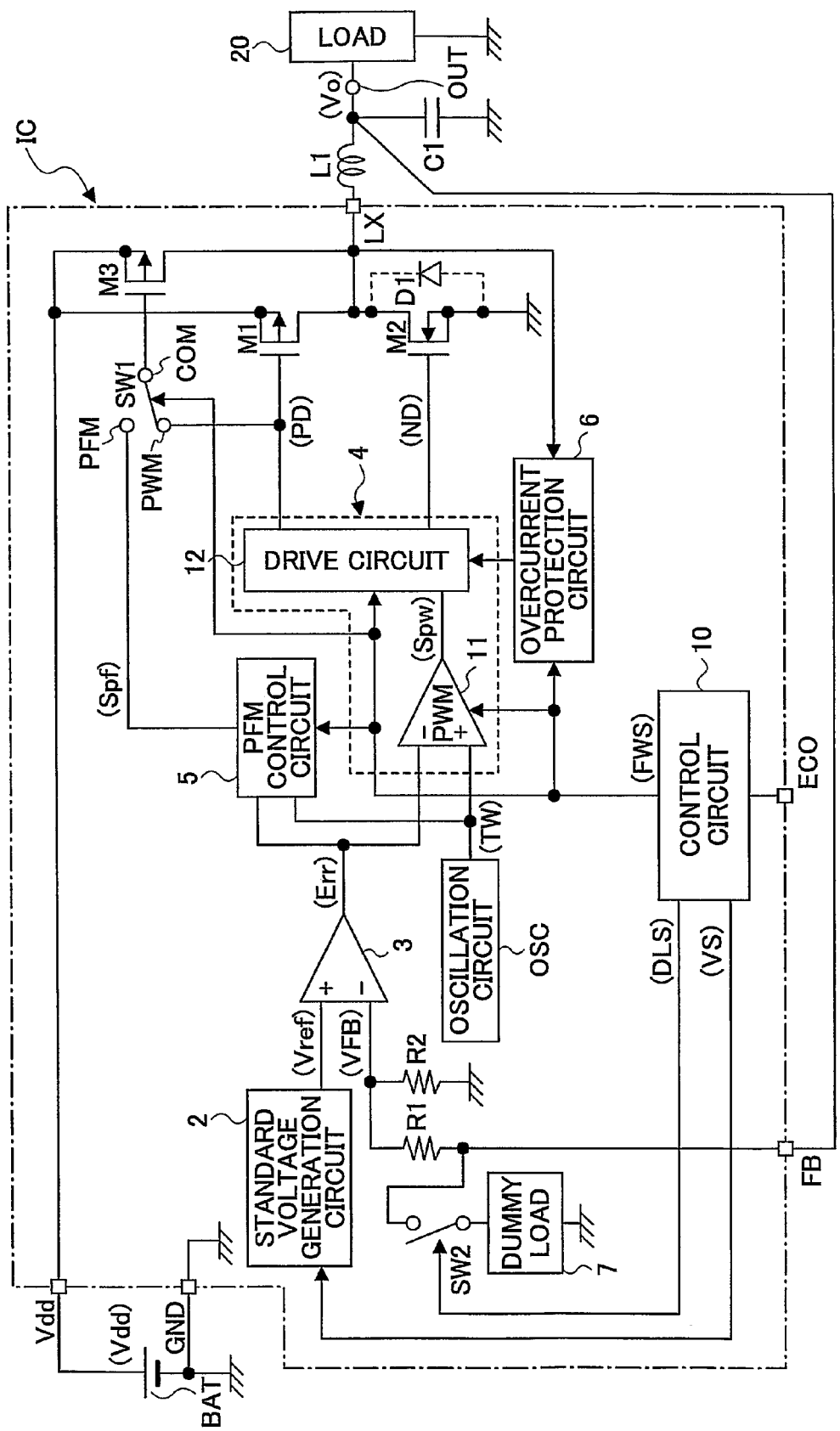
FIG. 1 is a configuration example of a switching regulator according to the first embodiment of the present invention.

FIG. 1 is a configuration example of a switching regulator 1 according to the first embodiment of the present invention.

In FIG. 1, an output voltage variable switching regulator is provided for generating a predetermined voltage from an input voltage Vdd input to the Vdd terminal which is an input terminal from a DC voltage BAT and outputting the predetermined voltage as an output voltage Vo from an output terminal OUT to a load 20.

The switching regulator 1 includes a first switching element M1 comprising a PMOS transistor performing a switching operation for controlling outputting the input voltage Vdd, another switching element M2 for synchronous rectification comprising an NMOS transistor, an inductor L1 and a condenser C1 comprising a smoothing circuit, and output voltage detecting resistors R1 and R2 for dividing the output voltage Vo so as to generate and output a divided voltage VFB.

Moreover, the switching regulator 1 further includes a reference voltage generation circuit 2 comprising a D/A converter generating and outputting a reference voltage Vref according to an input voltage setting signal VS, an error amplifying circuit 3 comparing the divided voltage VFB with the reference voltage Vref and outputting an output signal Err according to the voltage comparison result, and a PWM control circuit 4 controlling switching of the first switching element M1 and the second switching element M2 for synchronous rectification by performing PWM control on the first switching element M1 and the second switching element M2 for synchronous rectification according to the output signal Err from the error amplifying circuit 3.

The switching regulator 1 moreover includes a second switching element M3 comprising a CMOS transistor smaller than the CMOS transistor of the first switching element M1 in which the second switching element M3 controls outputting the input voltage Vdd input to the Vdd terminal, a PFM control circuit 5 performing PFM control on the second switching element M3 according to the output signal Err of the error amplifying circuit 3, an oscillation circuit OSC generating a triangular wave signal TW of a predetermined frequency and outputting the triangular wave signal TW to each of the PWM control circuit 4 and the PFM control circuit 5. The second switching element M3 has an on-resistance larger than the on-resistance of the first switching element M1 and a gate capacitance smaller than the gate capacitance of the first switching element M1.

The switching regulator 1 further includes a first switch SW1 outputting one of a signal PD output from the PWM control circuit 4 to a gate of the first switching element M1 and a signal Spf output from the PFM control circuit 5, to a gate of the second switching element M3 according to the switching signal FWS directing switching the operating mode. In addition, the switching regulator 1 includes an over-current protection circuit 6 performing the steps of detecting the electric current flowing into the inductor L1, determining whether the detected electric current is over a predetermined value, and switching off the first switching element M1 and the switching element M2 for synchronous rectification for the PWM control circuit 4 when the detected electric current is over the predetermined value.

The switching regulator 1 furthermore includes a dummy load 7 which is a pseudo load in which a predetermined electric current flows, a second switch SW2 controlling the connection of the dummy load 7 to the output terminal OUT, and a control circuit 10 generating and outputting the voltage setting signal VS and the switching signals FWS and DLS according to a predetermined sequence. It should be noted that the reference voltage generation circuit 2, the error amplifying circuit 3, the PWM control circuit 4, the PFM control circuit 5, the oscillation circuit OSC, the resistors R1 and R2, the first and second switches SW1 and SW2, and the control circuit 10 comprise a control switching circuit part. In addition, the reference voltage generation circuit 2, the error amplifying circuit 3, the PWM control circuit 4, the oscillation circuit OSC, and the resistors R1 and R2 comprise a PWM control circuit part. The reference voltage generation circuit 2, the error amplifying circuit 3, the PFM control circuit 5, the oscillation circuit OSC, and the resistors R1 and R2 comprise a PFM control circuit part. The first switch SW1 comprises a switching circuit part. The control circuit 10 and the second switch SW2 comprise a control circuit part. Further, the switching element M2 for synchronous rectification, the inductor L1 and the condenser C1 comprise a smoothing circuit part.

The PWM control circuit 4 includes PWM circuit 11 generating and outputting a pulse signal Spw from the output signal Err of the error amplifying circuit 3 and the triangular wave signal TW of the oscillation circuit OSC so as to perform the PWM control, and a drive circuit 12 generating and driving the control signal PD for controlling switching the first switching element M1 according to the pulse signal Spw from the PWM circuit 11 and a control signal ND for controlling switching the switching element M2 for synchronous rectification.

It should be noted that in the switching regulator 1, each part excluding the inductor L1 and the condenser C1 is integrated in an IC. The IC includes terminals Vdd, LX, ECO, FB and GND. The Vdd terminal is provided as an input terminal of the switching regulator 1. The GND terminal is connected to ground voltage.

The DC battery BAT is connected between the Vdd terminal and the GND terminal. The input voltage Vdd is input from the DC battery BAT to the Vdd terminal. A load 20 is connected between the output terminal OUT and ground. The first switching element M1 and the second switching element M3 are connected in parallel between the Vdd terminal and the LX terminal. The switching element M2 for synchronous rectification is connected between the LX terminal and ground. In addition, the inductor L1 is connected between the LX terminal and the output terminal OUT. The condenser C1 is connected between the output terminal OUT and ground. The connection between the inductor L1 and the condenser C1 is connected to the FB terminal. The resistors R1 and R2 are connected in series between the FB terminal and ground.

A part connecting the resistors R1 and R2 is connected to an inverting input terminal of the error amplifying circuit 3. The reference voltage Vref is input to a non-inverting input terminal of the error amplifying circuit 3. The output signal Err of the error amplifying circuit 3 is output to each of the PFM control circuit 5 and an inverting input terminal of a comparator comprising the PWM circuit 11. The triangular wave signal TW from the oscillation circuit OSC is output to each of the PFM control circuit 5 and a non-inverting input terminal of the PWM circuit 11. The pulse signal Spw from the PWM circuit 11 is output to the drive circuit 12. The pulse signal Spf output from the PFM control circuit 5 is input to the PFM terminal of the first switch SW1.

The drive circuit 12 outputs the control signal PD for controlling switching the first switching element M1 to each of the gate of the first switching element M1 and the PWM terminal of the first switch SW1. The drive circuit 12 further outputs the control signal ND for controlling switching the switching element M2 for synchronous rectification to the gate of the switching element M2 for synchronous rectification. A COM terminal of the first switch SW1 is connected to the gate of the second switching element M3. The overcurrent protection circuit 6 monitors the electric current flowing into the LX terminal and outputs the monitoring result to the drive circuit 12. In addition, the switching signal FWS from the control circuit 10 is input to each of the PFM control circuit 5, the overcurrent protection circuit 6, the PWM circuit 11, the drive circuit 12 and the first switch SW1. Further, the second switch SW2 and the dummy load 7 are connected in series between the FB terminal and ground. The switching signal DLS is input from the control circuit 10 to the second switch SW2. The second switch SW2 performs switching according to the switching signal DLS.

In the above described configuration, the switching signal FWS is provided for switching between the normal drive mode and the light-load drive mode with a consumption current smaller than the normal drive mode. The control circuit 10 generates and outputs the switching signal FWS according to a control signal input to the ECO terminal from the outside. It should be noted that the control circuit 10 can output the switching signal FWS so as to switch to the light-load drive mode when the electric current flowing in the load 20 is measured and found out to be under a predetermined value. Or the control circuit 10 can output the switching signal FWS when the device including the switching regulator 1 shifts to the stand-by mode. It should be noted that the light-load drive mode is the first operating mode, while the normal drive mode is the second operating mode.

First, a description is given of a case in which the switching signal FWS selects the normal drive mode. In this case, the PFM control circuit 5 stops operations and cuts the consumption electric current in the PFM control circuit 5 or reduces the consumption of electric current to the minimum. Simultaneously, the PWM circuit 11, the drive circuit 12 and the overelectric current protection circuit 6 operate. The switching regulator 1 operates as a switching regulator of synchronous rectification type. Further, the first switch SW1 is switched so that the COM terminal can be connected to the PWM terminal. Then, the control signal PD from the drive circuit 12 is input to the gate of the second switching element M3.

According to the above description, each of the first and second switching elements M1 and M3 performs a switching operation. When the first and second switching elements M1 and M3 are in an ON state, an electric current is supplied to the inductor L1. At this time, the switching element M2 for synchronous rectification is in an OFF state. When each of the first and second switching elements M1 and M3 are in the OFF state, the switching element M2 for synchronous rectification is in the ON state. Then, the energy stored in the inductor L1 is transferred through the switching element M2 for synchronous rectification. The electric current generated at this time is smoothed in the condenser C1 and output via the output terminal OUT to the load 20.

Moreover, the output voltage Vo output from the output terminal OUT is divided into the divided voltage VFB in the output voltage detecting resistors R1 and R2. Then, the divided voltage VFB is input to the inverting input terminal of the error amplifying circuit 3. Since the reference voltage Vref is input to the non-inverting input terminal of the error amplifying circuit 3, the voltage difference between the divided voltage VFB and the reference voltage Vref is amplified in the error amplifying circuit 3 and output to the inverting input terminal of the PWM circuit 11. The triangular wave signal TW from the oscillation circuit OSC to is input the non-inverting input terminal of the PWM circuit 11. The PWM circuit 11 outputs the pulse signal Spw on which the PWM control is performed to the drive circuit 12.

As the output voltage Vo of the switching regulator 1 increases, the output signal Err of the error amplifying circuit 3 is reduced. The duty cycle of the pulse signal Spw from the PWM circuit 11 is also reduced. As a result, the period where the first and second switching elements M1 and M3 are in the ON state is reduced. The output voltage Vo of the switching regulator 1 is controlled so as to be lowered. When the output voltage Vo of the switching regulator 1 becomes small, operations reverse to the above described operations are performed. Accordingly, the output voltage Vo of the switching regulator 1 is controlled to be constant.

The overcurrent protection circuit 6 compares the voltage drops of the respective switching elements M1 and M3 with the predetermined voltage when the switching elements M1 and M3 are in the ON state. When the voltage drops become greater than the predetermined voltage, the overcurrent protection circuit 6 outputs a predetermined signal so as to stop the operation of the drive circuit 12. When the drive circuit 12 stops operating, the overcurrent protection circuit 6 sets the control signal PD to a high level and the control signal ND a low level so that the first and second switching elements M1 and M3 and the switching element M2 for synchronous rectification can be switched off. Accordingly, the supply of the output electric current from the output terminal OUT is stopped.

Next, a description is given of a case where the switching signal FWS selects the light-load drive mode. In this case, the PFM control circuit 5 operates, while the PWM circuit 11, the drive circuit 12, and the overcurrent protection circuit 6 stop operations. The consumption electric currents thereof are cut or reduced to the minimum. Moreover, the first switch SW1 is switched so that the COM terminal can be connected to the PFM terminal. The pulse signal Spf from the PFM control circuit 5 on which the PFM control is performed is input to the gate of the second switching element M3. The second switching element M3 performs switching operations according to the pulse signal Spf from the PFM control circuit 5. At this time, since the drive circuit 12 stops the operation, the switching element M2 for synchronous rectification remains in the OFF state. Accordingly, the energy stored in the inductor L1 is transferred through a parasite diode D1 connected between the source and drain of the switching element M2 for synchronous rectification.

Figure 2:
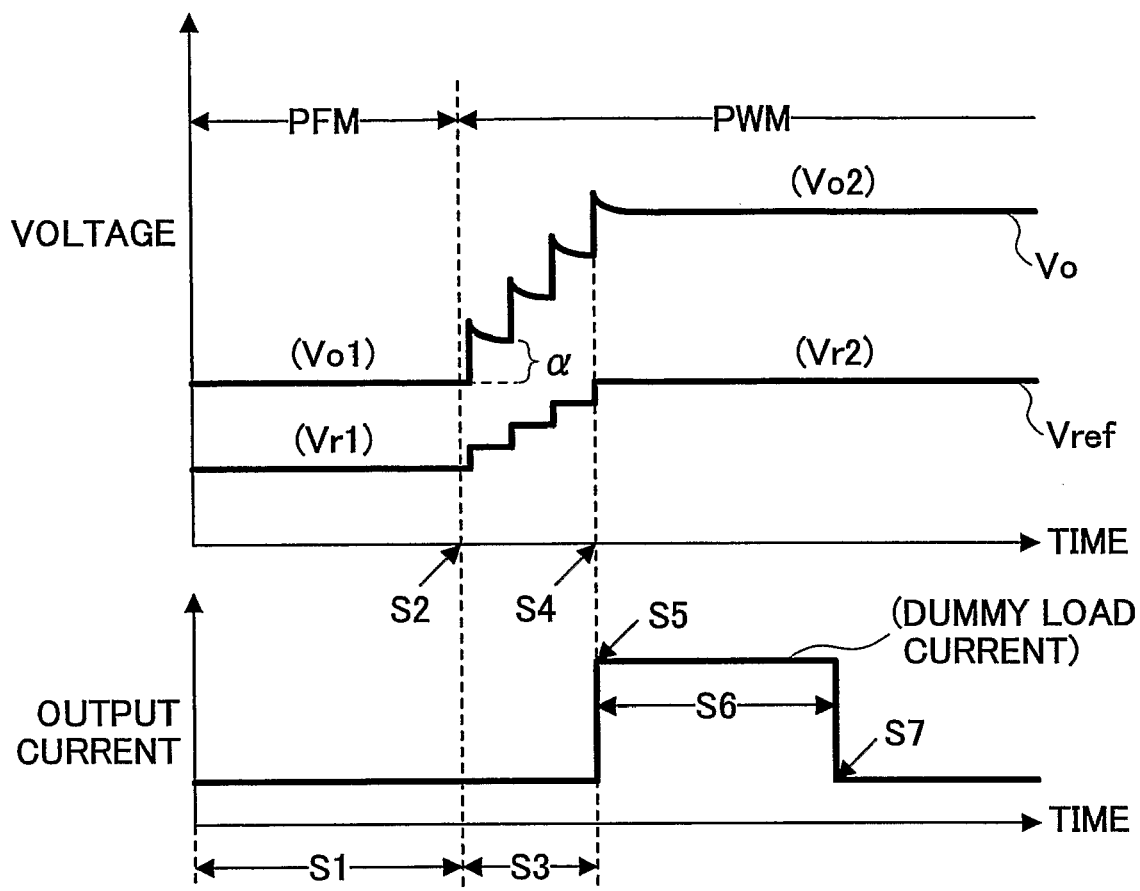
FIG. 2 is a timing chart illustrating an operating example of shifting from a light-load drive mode to a normal drive mode.
Figure 3:
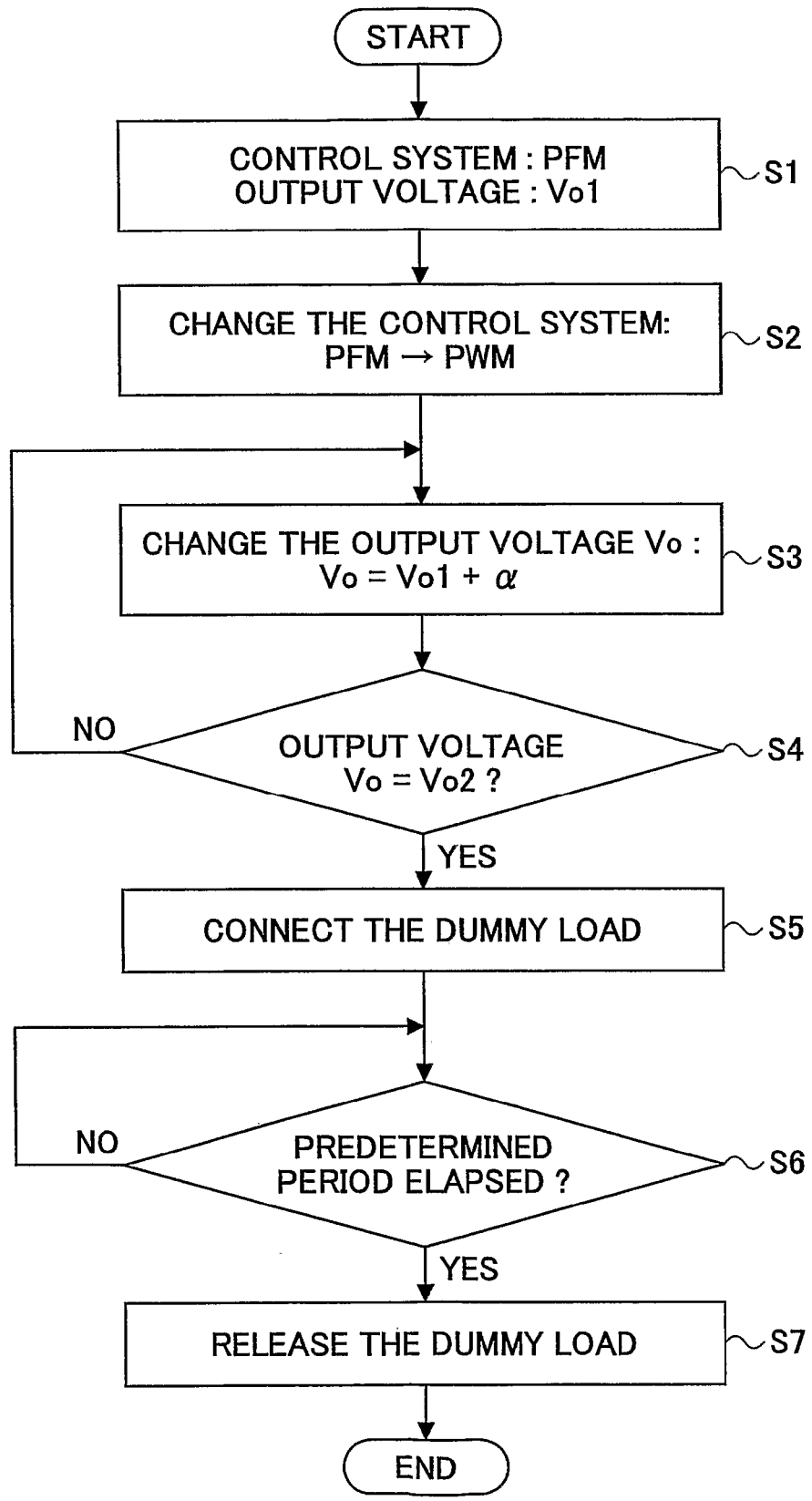
FIG. 3 is a flowchart illustrating an operating example of a control-circuit 10 shown in FIG. 1.

Here, a description is given of the operation when the light-load drive mode is shifted to the normal drive mode with reference to a timing chart shown in FIG. 2 and a flowchart shown in FIG. 3. It should be noted that S1 through S7 shown in FIG. 2 corresponds to S1 through S7 shown in FIG. 3.

In Step S1, since the light-load drive mode is selected, the control circuit 10 sets the reference voltage Vref of the reference voltage generation circuit 2 by sending the voltage setting signal VS so that the output voltage Vo equals the first voltage Vo1 which is the predetermined voltage. Further, the control circuit 10 directs the switching regulator 1 to perform the PFM control with the switching signal FWS, and to switch off the second switch SW2 with the switching signal DLS.

Next, in step S2, with the switching signal FWS, the control circuit 10 directs the switching regulator 1 to perform the PWM control. Then, in step S3, the control circuit 10 changes the reference voltage Vref output with the voltage setting signal VS so as to increase the output voltage Vo of the switching regulator 1 gradually. At this time, the control circuit 10 adjusts the output voltage Vo by changing the reference voltage Vref output from the reference voltage generation circuit 2. The reference voltage generation circuit 2 comprises a D/A converter.

The reference voltage generation circuit 2 generates and outputs a voltage according to the combination of bits of the voltage setting signal VS comprising plural bits input from the control circuit 10. The control circuit 10 directs the switching regulator 1 to perform the PWM control, and then, outputs the voltage setting signal VS to the reference voltage generation circuit 2 so as to increase the output voltage Vo by $\alpha V$. It should be noted that the overshoot voltage is generated as a component of the output voltage at this time. However, the change of the output voltage Vo, i.e., $\alpha V$ is very small, and thus, the overshoot voltage is also small. Accordingly, a defect is not generated.

Next, in step S4, the control circuit 10 determines whether the voltage setting signal VS sets the reference voltage Vref so that the output voltage Vo can be equal to the second voltage Vo2 which is the predetermined voltage larger than the first voltage Vo1. When the voltage setting signal VS contains the data which set the reference voltage Vref so that the output voltage Vo can be equal to the predetermined second voltage Vo2 (Yes in step S4), then the operation proceeds step S5. On the contrary, in step S4, if the voltage setting signal VS contains data which set the reference voltage Vref so that the output voltage Vo is less than the second voltage Vo2 (No in step S4), then, the operation returns to step S3. In other words, in steps S3 and S4, the output voltage Vo of the switching regulator 1 is gradually increased from the first voltage Vo1 to the second voltage Vo2. Whenever the predetermined period elapses, the combination of the bits of the voltage setting signal VS is changed and the output voltage Vo is increased by $\alpha V$. As shown in step S4, when the output voltage Vo reaches the second voltage Vo2, the combination of the bits of the voltage setting signal VS is stored and the output voltage Vo is fixed equal to the second voltage Vo2.

The voltage amplification $\alpha$ of the output voltage increased at one step is determined by the voltage difference between the first voltage Vo1 and the second voltage Vo2 and by a number of bits of the D/A converter comprising the reference voltage generation circuit 2 so as to prevent the overshoot voltage from affecting the load 20. For example, when the voltage amplification a is set approximately 20 mV, the voltage amplification $\alpha$ is fixed. Accordingly, as the voltage difference between the first voltage Vo1 and the second voltage Vo2 becomes larger, the number of steps for reaching the second voltage Vo2 is increased. It should be noted that in FIG. 2, when the output voltage Vo is the first voltage Vo1, the reference voltage Vr is assigned Vr1. When the output voltage Vo is the second voltage Vo2, the reference voltage Vr is assigned Vr2.

Next, in step S5, the control circuit 10 outputs the switching signal DLS to switch the second switch SW2 into the conductive state. Accordingly, the second switch is switched on so that the dummy load 7 can be connected between the output terminal OUT and ground.

Here, a description is given of the reason why the dummy load is connected.

When the control of the switching regulator 1 is switched from the PFM control to the PWM control, the load 20 is still not in the normal drive mode, since the electric current flowing into the load 20 is substantially the same as the light-load drive mode. Thus, the electric current is extremely low. As above described, when the PFM control is switched to the PWM control in a state where the electric current flowing into the load 20 is substantially zero, the PWM circuit 11 performs abnormal operations such as a burst oscillation immediately after switching the control. Thus, the output voltage Vo becomes unstable.

It should be noted that while increasing the output voltage Vo, the charging electric current flows in the condenser C1 connected to the output terminal OUT so as to prevent the PWM circuit 11 from performing abnormal operations such as the burst oscillation. However, after the output voltage Vo becomes equal to the second voltage Vo2, the PWM circuit 11 performs an abnormal operation. Thus, the output voltage Vo becomes unstable. In order to avoid the abnormal operations, after the output voltage Vo becomes equal to the second voltage Vo2, the dummy load 7 is connected to the output terminal OUT until the PWM circuit 11 performs stable operations. As for the timing of connecting the dummy load 7, the dummy load 7 can be connected immediately after switching to the PWM control. However, as described above, since abnormal operations are prevented while increasing the output voltage Vo, it is desirable to connect the dummy load 7 immediately after the output voltage Vo becomes equal to the second voltage Vo2.

The dummy load 7 can be connected starting immediately after switching to the PWM control and until the output voltage Vo reaches the second voltage Vo2. However, in this case, extra electricity is consumed by the electric current flowing into the dummy load 7 from when the dummy load 7 is connected until the output voltage reaches the second voltage Vo2.

Next, in step S6, the control circuit 10 maintains the dummy load 18 connected for a predetermined period longer than the period needed for the PWM control to be normally performed. In step S7, after the predetermined period has elapsed, with the switching signal DLS, the second switch SW2 is switched off so as to terminate the flow. Accordingly, the operation of shifting the light-load drive mode to the normal drive mode is completed.

Figure 4:
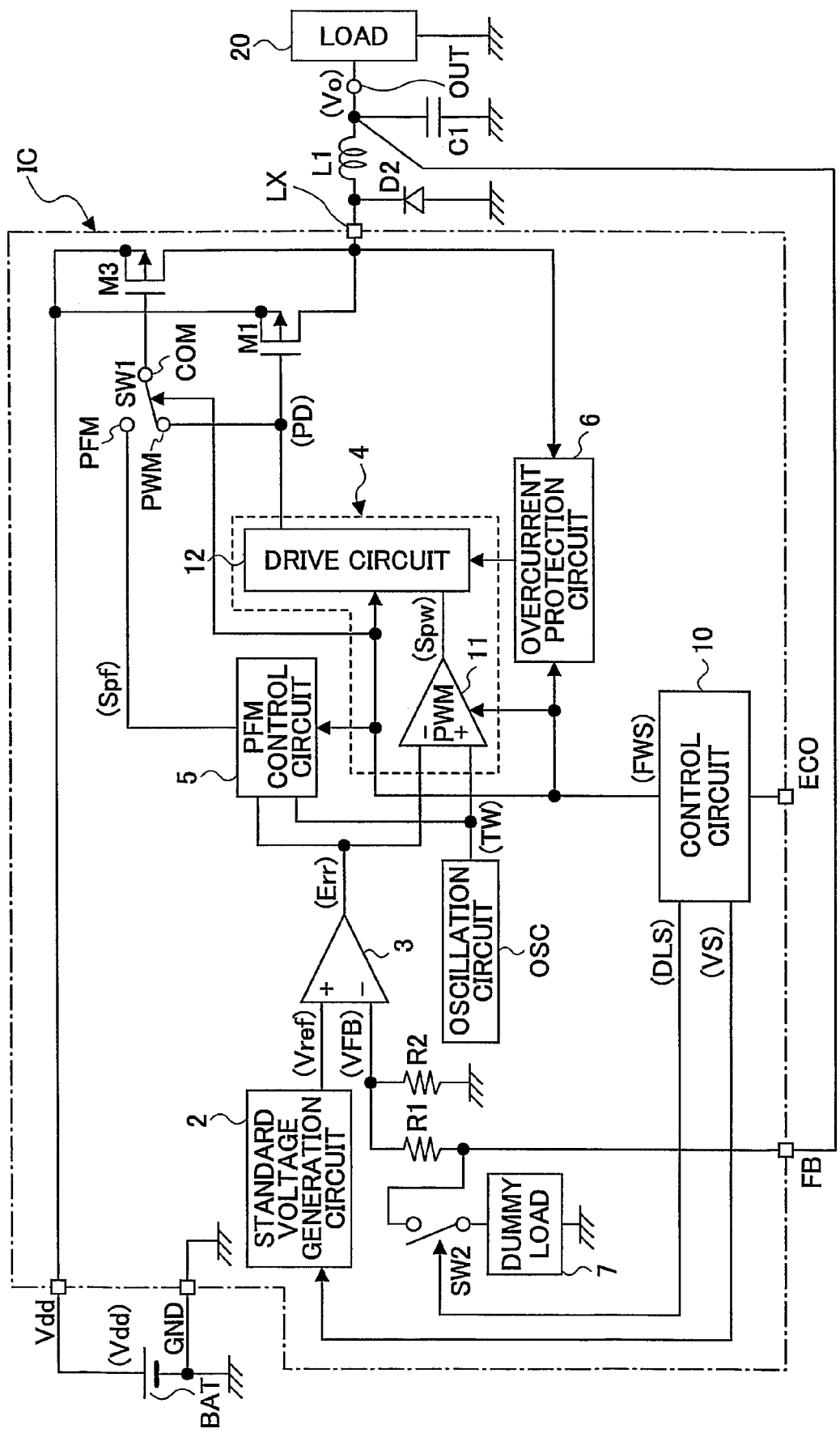
FIG. 4 is another configuration example of the switching regulator according to the first embodiment of the present invention.
Figure 5:
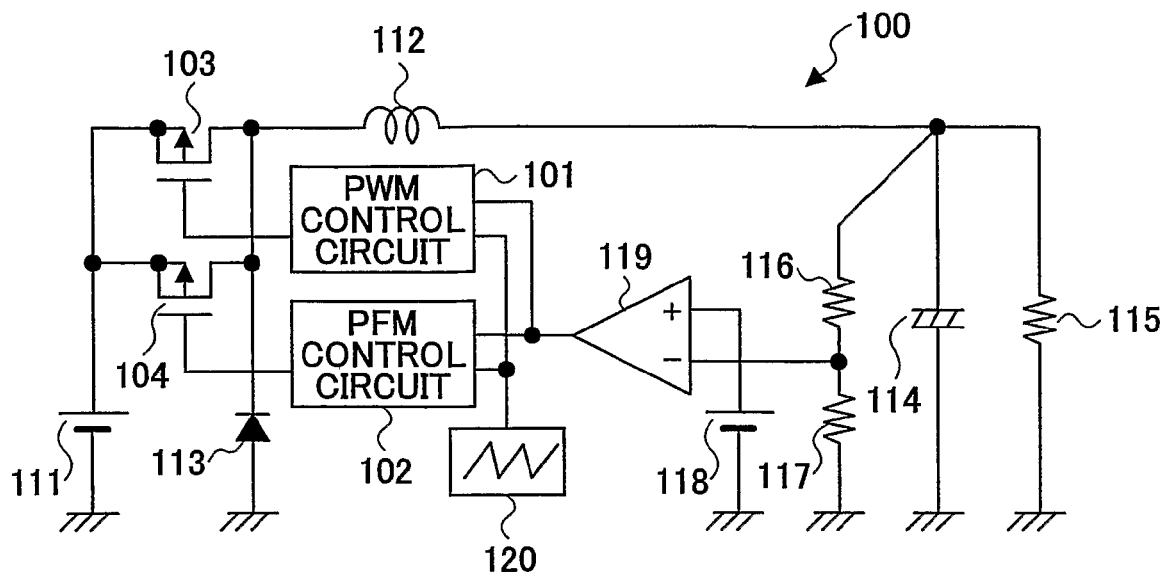
FIG. 5 is a schematic circuit diagram illustrating an example of a conventional switching regulator.
Figure 6:
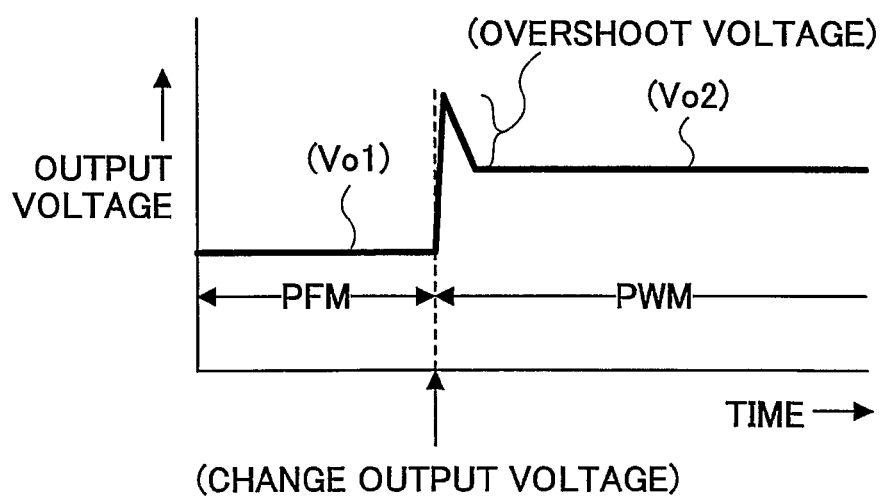
FIG. 6 is a view illustrating a waveform example of the output voltage shown in FIG. 5.

It should be noted that a flywheel diode D2 can be used as a substitute for the switching element M2 for synchronous rectification shown in FIG. 1. The configuration of this case is shown in FIG. 4. In FIG. 4, the same reference numbers are assigned to the same or substantially the same components shown in FIG. 1. FIG. 4 shows the configuration example in which the flywheel diode D2 is disposed outside of the IC. When a diode such as a PN junction-type suited to integration is used as the flywheel diode D2, the flywheel diode D2 is provided inside of the IC.

Moreover, according to the description above, when increasing the output voltage Vo from the first voltage Vo1 to the second voltage Vo2, the output voltage Vo is evenly and gradually increased at intervals of αV. The present invention is not limited to this; the output voltage Vo can be increased gradually from the first voltage Vo1 to the second voltage Vo2 whether evenly and unevenly.

Accordingly, the switching regulator according to the first embodiment of the present invention switches the PFM control to the PWM control where the output voltage Vo is the first voltage Vo1, when the light-load drive mode is shifted to the normal drive mode. Then, the output voltage Vo is gradually increased little by little. Therefore, the overshoot generated when increasing the output voltage Vo can be controlled to be small. Thus, the output voltage Vo can be switched without being influenced by the overshoot. Moreover, the dummy load is connected so as to prevent an abnormal operation such as a burst oscillation immediately after the PFM control is shifted to the PWM control.

According to at least one of the embodiments of the present invention, when shifting from the first operating mode to the second operating mode, the control switching circuit part switches from the PFM control to the PWM control where the output voltage from the output terminal is equal to the first voltage.

According to at least one of the embodiments of the present invention, the switching regulator further includes a dummy load in which a predetermined electric current flows. The control switching circuit part connects the dummy load to the output terminal for a predetermined period when the output voltage from the output terminal becomes equal to the second voltage.

According to at least one of the embodiments of the present invention, the control switching circuit part includes a PWM control circuit part performing the PWM control on the first switching element, a PFM control circuit performing the PFM control on the second switching element, a switching circuit part controlling outputting control signals from each of the PWM control circuit part and the PFM control circuit part to the second control electrode of the second switching element, and a control circuit part controlling operations of the PWM control circuit part, the PFM control circuit part and the switching circuit part. The control circuit part stops operations of the PWM control circuit part and directs the switching circuit part to output the control signal from the PFM control circuit part exclusively to the second control electrode of the second switching element in the first operating mode. The control circuit part operates the PWM control circuit part and directs the switching circuit part to output the control signal from the PWM control circuit part exclusively to the second control electrode of the second switching element in the second operating mode. The control circuit part increases the output voltage stepwise progressively from the first voltage to the second voltage where the control circuit part stops the operations of the PWM control circuit part and directs the switching circuit part to output the control signal from the PWM control circuit part exclusively to the second control electrode of the second switching element when shifting the first operating mode to the second operating mode.

According to at least one of the embodiments of the present invention, the switching regulator further includes a dummy load in which a predetermined electric current flows. The control circuit part connects the dummy load to the output terminal for a predetermined period when the output voltage from the output terminal becomes equal to the second voltage.

According to at least one of the embodiments of the present invention, an electric current flowing into the load in the first operating mode is smaller than the electric current flowing into the load in the second operating mode.

According to at least one of the embodiments of the present invention, as the voltage difference between the first voltage and the second voltage becomes large, the number of steps of increasing the output voltage stepwise progressively from the first voltage to the second voltage is increased in the control switching circuit part.

According to at least one of the embodiments of the present invention, the smoothing circuit part connected to the first switching element in series comprises a switching element for synchronous rectification. The switching element for synchronous rectification is controlled by the control switching circuit when performing switching. The first switching element, the second switching element, the control switching circuit part, the switching element for synchronous rectification and the dummy load are integrated into an IC.

According to at least one of the embodiments of the present invention, the method for switching the output voltage of the switching regulator further comprising a step of switching the PFM control to the PWM control in a state where the output voltage from the output terminal is the first voltage when shifting from the first operating mode to the second operating mode.

According to at least one of the embodiments of the present invention, the switching regulator further includes a dummy load in which a predetermined electric current flows. The method further includes a step of connecting the dummy load to the output terminal for a predetermined period when the output voltage from the output terminal becomes equal to the second voltage.

According to at least one of the embodiments of the present invention, in the method for switching the output voltage of the switching regulator, an electric current flowing into the load in the first operating mode is smaller than the electric current flowing into the load in the second operating mode.

According to at least one of the embodiments of the present invention, the method for switching the output voltage of the switching regulator further comprising a step of increasing the number of steps of increasing the output voltage stepwise progressively from the first voltage to the second voltage as the voltage difference between the first voltage and the second voltage becomes large.

According to the above described switching regulator, the dummy load which is a pseudo load in which a predetermined electric current flows is further installed. The control switching circuit part connects the dummy load to the output terminal for a predetermined period when the output voltage from the output terminal becomes equal to the second voltage. Accordingly, even if the load electric current does not increase immediately after the PFM control is shifted to the PWM control, the PWM control can be performed stably.

Further, the present invention is not limited to these embodiments, but variations and modifications may be made without departing from the scope of the present invention.

The present application is based on Japanese Priority Application No. 2004-342430 filed on Nov. 26, 2004, with the Japanese Patent Office, the entire contents of which are hereby incorporated by reference.

The invention claimed is:

1. A switching regulator converting an input voltage to a predetermined voltage and outputting the predetermined voltage to a load through an output terminal, comprising:

a first switching element including a first control electrode, said first switching element performing switching according to a control signal input to the first control electrode and controlling outputting the input voltage;

a second switching element including a second control electrode having capacitance smaller than the capacitance of the first control electrode of the first switching element and an on-resistance larger than the on-resistance of the first switching element, said second switching element performing switching according to a control signal input to the second control electrode and controlling outputting the input voltage;

a control switching circuit part performing one of a PWM control on both of the first switching element and the second switching element and a PFM control only on the second switching element according to an operating mode so that a voltage output from the output terminal is the predetermined voltage; and a smoothing circuit smoothing a voltage output from each of the first switching element and the second switching element and outputting the smoothed voltage to the output terminal, wherein said control switching circuit part performs said PWM control to increase the voltage from said output terminal step by step from a predetermined first voltage to a second voltage when a first operating mode shifts into a second operating mode, and wherein in said first operating mode, said PFM control is performed and the output voltage from said output terminal is the predetermined first voltage, and in said second operating mode, said PWM control is performed and the output voltage from said output terminal is the second voltage that is larger than the predetermined first voltage.

2. The switching regulator as claimed in claim 1, wherein when shifting from the first operating mode to the second operating mode, said control switching circuit part switches from the PFM control to the PWM control where the output voltage from the output terminal is equal to the first voltage.

3. The switching regulator as claimed in claim 1, further comprising a dummy load in which a predetermined electric current flows, wherein said control switching circuit part connects said dummy load to the output terminal for a predetermined period when the output voltage from the output terminal becomes equal to the second voltage.

4. The switching regulator as claimed in claim 1, wherein said control switching circuit part comprises:

a PWM control circuit part performing the PWM control on the first switching element;

a PFM control circuit part performing the PFM control on the second switching element;

a switching circuit part controlling outputting control signals from each of the PWM control circuit part and the PFM control circuit part to the second control electrode of the second switching element; and a control circuit part controlling operations of the PWM control circuit part, the PFM control circuit part and the switching circuit part;

wherein in the first operating mode, the control circuit part stops operations of the PWM control circuit part and directs the switching circuit part to output the control signal from the PFM control circuit part exclusively to the second control electrode of the second switching element, wherein in the second operating mode, the control circuit part operates the PWM control circuit part and directs the switching circuit part to output the control signal from the PWM control circuit part exclusively to the second control electrode of the second switching element, and wherein the control circuit part increases the output voltage stepwise progressively from the first voltage to the second voltage where the control circuit part stops the operations of the PFM control circuit part and directs the switching circuit part to output the control signal from the PWM control circuit part exclusively to the second control electrode of the second switching element when shifting from the first operating mode to the second operating mode.

5. The switching regulator as claimed in claim 4, further comprising a dummy load in which a predetermined electric current flows, wherein said control switching circuit part connects said dummy load to the output terminal for a predetermined period when the output voltage from the output terminal becomes equal to the second voltage.

6. The switching regulator as claimed in claim 1, wherein an electric current flowing into the load in the first operating mode is smaller than the electric current flowing into the load in the second operating mode.

7. The switching regulator as claimed in claim 1, wherein the larger is the voltage difference between the first voltage and the second voltage, the more steps has said control switching circuit for increasing said output voltage step by step from the first voltage to the second voltage.

8. The switching regulator as claimed in claim 3, wherein the smoothing circuit part connected to the first switching element in series comprises a switching element for synchronous rectification, said switching element for synchronous rectification being controlled by the control switching circuit when performing switching, and wherein the first switching element, the second switching element, the control switching circuit part, the switching element for synchronous rectification and the dummy load are integrated into an IC.

9. A method for switching an output voltage of a switching regulator with variable output voltage, said switching regulator comprising: an input terminal; an output terminal; a first switching element including a first control electrode, said first switching element performing switching according to a control signal input to the first control electrode and controlling outputting an input voltage; and a second switching element including a second control electrode having capacitance smaller than the capacitance of the first control electrode of the first switching element and an on-resistance larger than the on-resistance of the first switching element, said second switching element performing switching according to a control signal input to the second control electrode and controlling outputting the input voltage, wherein said switching regulator is enabled to change the output voltage so as to convert the input voltage input from the input terminal into a predetermined voltage and to output the predetermined voltage to the load via the output terminal by performing at least one of a PWM control on both of said first switching element and said second switching element and a PFM control only on said second switching element according to an operating mode, said method comprising the steps of:

performing said PWM control; and increasing the voltage from the output terminal step by step from a predetermined first voltage to a second voltage when a first operating mode shifts into a second operating mode, wherein in said first operating mode, said PFM control is performed and the output voltage from said output terminal is the predetermined first voltage, and in said second operating mode, said PWM control is performed and the output voltage from said output terminal is the second voltage that is larger than the predetermined first voltage.

10. The method for switching the output voltage of the switching regulator as claimed in claim 9, said method further comprising a step of switching the PFM control to the PWM control in a state where the output voltage from the output terminal is the first voltage when shifting the first operating mode to the second operating mode.

11. The method for switching the output voltage of the switching regulator as claimed in claim 9, said switching regulator further comprising a dummy load in which a predetermined electric current flows, said method further comprising a step of connecting said dummy load to the output terminal for a predetermined period when the output voltage from the output terminal becomes equal to the second voltage.

12. The method for switching the output voltage of the switching regulator as claimed in claim 9, wherein an electric current flowing into the load in the first operating mode is smaller than the electric current flowing into the load in the second operating mode.

13. The method for switching the output voltage of the switching regulator as claimed in claim 9, wherein the larger is the voltage difference between the first voltage and the second voltage, the more steps has said control switching circuit for increasing said output voltage step by step from the first voltage to the second voltage.

* * * * *